(12) United States Patent
Balazs et al.

(10) Patent No.: US 11,781,766 B2
(45) Date of Patent: Oct. 10, 2023

(54) SYSTEM AND METHOD FOR HUMIDIFICATION TEMPERATURE COMPENSATION

(71) Applicant: RESEARCH PRODUCTS CORPORATION, Madison, WI (US)

(72) Inventors: Nicholas J. Balazs, Madison, WI (US); Steven H. Jero, Madison, WI (US)

(73) Assignee: Research Products Corporation, Madison, WI (US)

( * ) Notice: Subject to any disclaimer, the term of this patent is extended or adjusted under 35 U.S.C. 154(b) by 0 days.

(21) Appl. No.: 17/532,585

(22) Filed: Nov. 22, 2021

(65) Prior Publication Data

US 2022/0163225 A1    May 26, 2022

Related U.S. Application Data

(60) Provisional application No. 63/118,093, filed on Nov. 25, 2020.

(51) Int. Cl.
| | | |
|---|---|---|
| *F24F 11/00* | (2018.01) | |
| *F24F 11/64* | (2018.01) | |
| *F24F 11/52* | (2018.01) | |
| *F24F 110/12* | (2018.01) | |
| *F24F 110/20* | (2018.01) | |

(52) U.S. Cl.
CPC .......... *F24F 11/0008* (2013.01); *F24F 11/52* (2018.01); *F24F 11/64* (2018.01); *F24F 2110/12* (2018.01); *F24F 2110/20* (2018.01)

(58) Field of Classification Search
CPC ........ F24F 11/0008; F24F 11/52; F24F 11/64; F24F 2110/12; F24F 2110/20; F24F 11/30; Y02B 30/70
See application file for complete search history.

(56) References Cited

U.S. PATENT DOCUMENTS 9,891,636 B2 * 2/2018 Wu ......................... F24F 11/30
11,333,378 B1 * 5/2022 Limp ..................... G05B 15/02
(Continued)

FOREIGN PATENT DOCUMENTS

CN    107765741 B  *  3/2018
CN    112556039 A  *  3/2021

OTHER PUBLICATIONS

Jeong, C.H., Yeo, M.S. and Kim, K.W., 2015. Experimental study on insulation performance and condensation characteristics of a vacuum insulated glass window. Journal of Asian Architecture and Building Engineering, 14(3), pp. 717-724. (Year: 2015).*

*Primary Examiner* — Alicia M. Choi
(74) *Attorney, Agent, or Firm* — Foley & Lardner LLP

(57) ABSTRACT

A humidity control system includes a humidification device configured to modify an indoor air humidity within a building and a humidity control device that is communicably coupled to the humidification device. The humidity control device is configured to receive a construction factor concerning a structure of the building, determine a plurality of indoor air humidity thresholds corresponding to a plurality of outdoor air temperatures based on the construction factor, receive a real-time outdoor air temperature, and control the humidification device to modify the indoor air humidity based on the plurality of indoor air humidity thresholds.

19 Claims, 5 Drawing Sheets

(56) References Cited

U.S. PATENT DOCUMENTS

| | | | | |
|---|---|---|---|---|
| 2005/0252983 | A1* | 11/2005 | Acker, Jr. | F24F 11/52 |
| | | | | 236/44 R |
| 2006/0167591 | A1* | 7/2006 | McNally | G06Q 50/06 |
| | | | | 700/291 |
| 2007/0084937 | A1* | 4/2007 | Ahmed | F24F 11/30 |
| | | | | 236/44 C |
| 2014/0156662 | A1* | 6/2014 | Konda | G06Q 10/0637 |
| | | | | 707/737 |
| 2016/0069579 | A1* | 3/2016 | Yabunouchi | F24F 11/30 |
| | | | | 165/238 |
| 2016/0245570 | A1* | 8/2016 | Han | F25B 49/022 |
| 2016/0313040 | A1* | 10/2016 | Trudeau | F25B 49/022 |
| 2018/0066854 | A1* | 3/2018 | Gagne | F24D 19/1009 |
| 2019/0017721 | A1* | 1/2019 | Motodani | F24F 11/64 |
| 2019/0234638 | A1* | 8/2019 | Song | F24F 11/62 |
| 2020/0113021 | A1* | 4/2020 | Patel | H05B 3/845 |
| 2020/0141597 | A1* | 5/2020 | Amundson | F24F 11/80 |

* cited by examiner

US 11,781,766 B2

SYSTEM AND METHOD FOR HUMIDIFICATION TEMPERATURE COMPENSATION

CROSS-REFERENCE TO RELATED APPLICATIONS

This application claims the benefit of and priority to U.S. Provisional Patent Application No. 63/118,093, filed on Nov. 25, 2020, the contents of which are incorporated herein by reference in their entirety.

BACKGROUND

The present disclosure relates generally to controlling indoor air humidity. More specifically, the present disclosure relates to systems and methods for maintaining comfortable levels of indoor air humidity when the outdoor air temperature falls below the dew point temperature of the indoor air.

SUMMARY

One embodiment of the disclosure is a system including humidification device configured to modify an indoor air humidity within a building and a humidity control device that is communicably coupled to the humidification device. The humidity control device is configured to receive a construction factor concerning the structure of a building, determine a plurality of indoor air humidity thresholds corresponding to a plurality of outdoor air temperatures based on the construction factor, receive a real-time outdoor air temperature, and control the humidification device to modify the indoor air humidity based on the plurality of indoor air humidity thresholds.

Another embodiment of the disclosure is a method including receiving, by a humidity control device, via a user interface of the humidity control device, a construction factor concerning a structure of a building. The method also includes determining, by the humidity control device, a plurality of indoor air humidity thresholds corresponding to a plurality of outdoor air temperatures based on the construction factor. The method also includes receiving, by the humidity control device, via a network interface of the humidity control device, a real-time outdoor air temperature. The method further includes controlling, by the humidity control device, a humidification device to modify an indoor air humidity within the building based on the plurality of indoor air humidity thresholds and the real-time outdoor air temperature.

Another embodiment of the disclosure is a system including humidification device configured to modify an indoor air humidity within a building and a humidity control device that is communicably coupled to the humidification device. The humidity control device is configured to receive a user-defined setting concerning an indoor air humidity, receive a real-time outdoor air temperature, determine an indoor air humidity threshold based on a non-linear equation that is a function of the user-defined setting and the real-time outdoor air temperature, and control the humidification device to modify the indoor air humidity based on the indoor air humidity threshold.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE FIGURES

A clear conception of the advantages and features constituting the present disclosure, and of the construction and operation of typical mechanisms provided with the present disclosure, will become more readily apparent by referring to the exemplary, and therefore non-limiting, embodiments illustrated in the drawings accompanying and forming a part of this specification, wherein like reference numerals designate the same elements in the several views, and in which.

DETAILED DESCRIPTION

Figure 1:
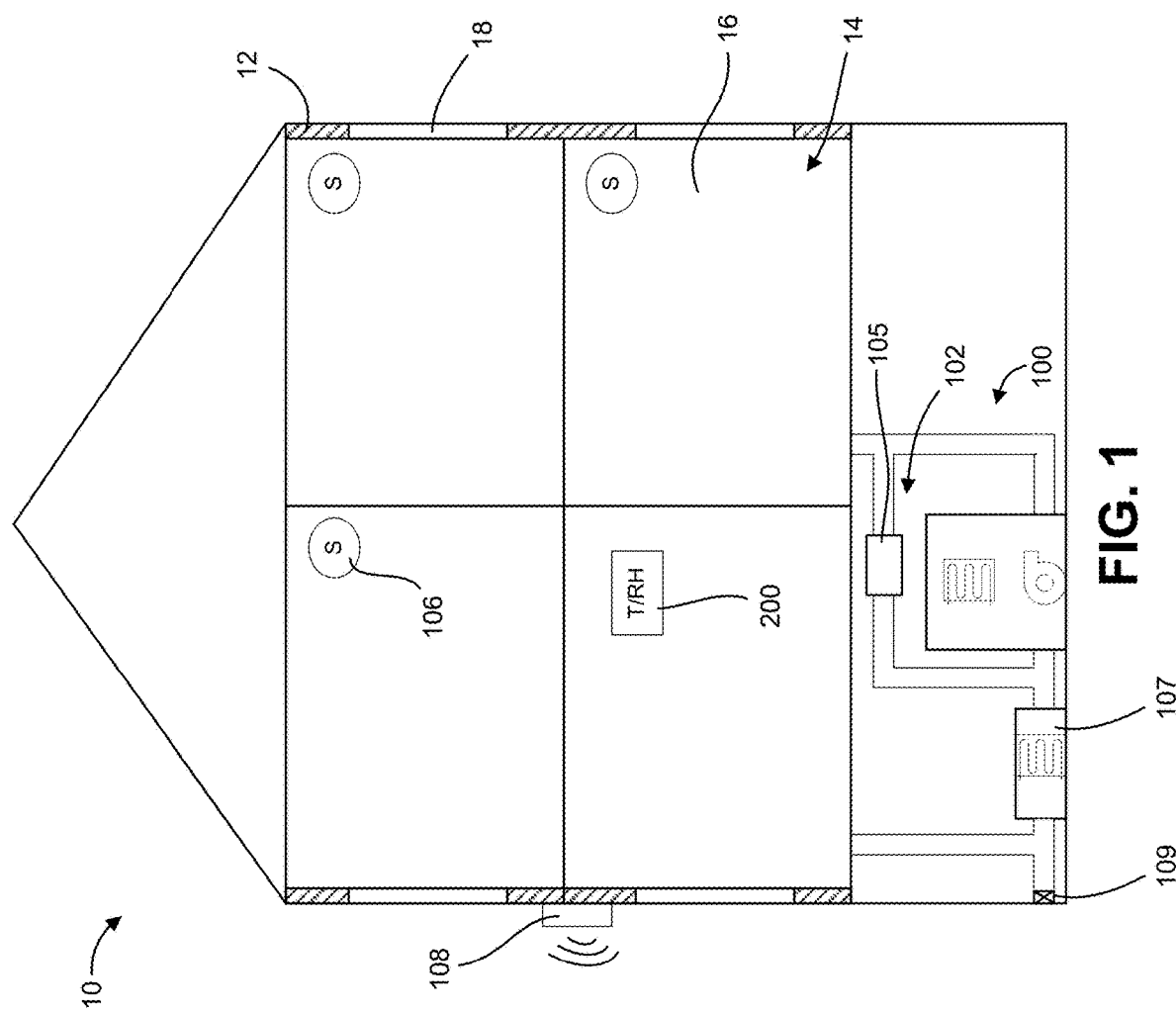
FIG. 1 is a schematic diagram of humidity control system, according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Many buildings include humidity control systems and/or devices (e.g., humidifiers), which maintain the level of humidity in the air within the building to improve occupant comfort (e.g., to prevent the buildup of static electricity, dry skin, drying of the mucous membranes in the nose and throat, etc.) and to reduce the transmission of viruses. Humidity control systems are particularly useful in the cold (e.g., winter) months, when the humidity levels in the outdoor air are low. Although indoor air humidification relieves many of these issues, excessive humidification can cause condensation to form on windows and other interior surfaces (e.g., interior surfaces of exterior walls, etc.) of the building. Condensation may be particularly problematic during the winter months or during cool days, when the temperature of the outdoor air falls below the dew point temperature of the indoor air (when the temperature of the outdoor air falls below the dew point temperature at which an occupant of the building is most comfortable). In these instances, condensation occurs when the temperature of at least one interior surface drops below the dew point temperature of the indoor air. Over time, the presence of liquid water on the interior surface can cause damage (e.g., the water can rot wooden framing materials and window trim, the water can freeze and crack structural materials, etc.), and/or cause the growth of mold and mildew. To help mitigate this problem, windows and exterior walls of the building may include insulating materials, or double-wall structures to reduce heat transfer to the outdoor environment. However, even for well-insulated structures, the indoor air humidity must often be reduced, in some cases well below occupant comfort levels, to ensure that no condensation occurs during the coldest parts of the day.

As used herein, the term "dew point" or "dew point temperature" refers to the temperature at which air becomes saturated with water vapor. Below the dew point, airborne water vapor will condense to form liquid water. When air cools to its dew point through contact with a surface that is colder than the air, water will condense onto the surface.

As used herein, the term "relative humidity" refers to a ratio of the actual amount of water vapor in the air divided by the maximum amount of water vapor that the air can hold (e.g., percent relative humidity (RH %)). Because the maximum amount of water vapor that the air can hold varies with temperature, the absolute humidity (i.e., the actual amount of water vapor in the air) between an indoor and an outdoor environment may differ even if the relative humidity of both environments is the same. In other words, unlike the dew point, the relative humidity is not a measure of the absolute amount of water vapor in the air.

As used herein, the term "setting," "user-defined setting," or "humidity setting" with reference to humidistat control refers to a user controlled humidity level that the humidistat is set to. The humidistat "setting" is an input to the humidistat that may be changed by the user, via a user interface of the humidistat or another device, to improve the user's feeling of comfort. For example, the "setting" may be varied in integer values of 1-7, with lower values corresponding to lower values of indoor relative humidity, and higher values corresponding to higher values of indoor relative humidity. In another embodiment, finer or coarser settings may be used. After achieving a desired comfort level within the building, the "setting" will very often remain static and unchanged, regardless of any changes in environmental conditions outside of the building.

As used herein, the term "set point" with reference to humidistat control refers to a calculated level of humidity that the humidistat controls the space to. The humidistat automatically changes the "set point" based on the fixed humidistat "setting" (controlled by the user) and the variable outdoor temperature, which is sensed at regular intervals.

In general, disclosed herein are systems and methods for maintaining comfortable levels of indoor air humidity when the outdoor air temperature falls below the dew point temperature of the indoor air. In one embodiment, the system includes an outdoor temperature sensor and a humidity control device that is configured to adjust the humidity of the indoor air. The humidity control device is configured to maintain the humidity of the indoor air at values that are less than or equal to a set of indoor air humidity thresholds (e.g., set points), which vary as a function of the outdoor air temperature. In one embodiment, the set of indoor air humidity thresholds together generate a non-linear control function that approximates the actual temperature variation of the interior surfaces of exterior walls and/or windows with variations in the outdoor air temperature. The humidity control device may be configured to automatically maintain the dew point of the indoor air (by controlling the humidity levels of the indoor air) to a value that is just below the approximate temperature of the interior surfaces of the exterior walls and/or windows. In other embodiments, the humidity control device may simply limit the maximum allowable relative humidity set point (e.g., % RH) that may be input by a user/occupant to control the humidification system. Among other benefits, the system improves occupant comfort by controlling humidity levels based on the actual properties of the building structure, rather than arbitrarily setting the humidity values to fixed values that prevent condensation during the coldest parts of the day. The control methodology results in average humidity levels that more closely conform to industry recommended humidity levels, such as the American Society of Heating, Refrigerating and Air-Conditioning Engineers (ASHRAE) standard 62.1-2016. The control methodology may also improve energy efficiency, by limiting the amount of time that the heating system (e.g., furnace) is operated throughout the day (due to the fact that humid air makes a person feel warmer, even at colder temperatures).

Humidity control systems generally include a humidifier, which delivers water to the air stream passing through the buildings heating, ventilation, and air conditioning (HVAC) system. The water evaporates in the air, and the humid, conditioned air is delivered to different parts of the building. In some embodiments, the humidity control systems may also include a dehumidifier, which draws moist/humid air over a refrigerated evaporator coil to reduce the moisture content (e.g., absolute humidity) of the air. Water within the air condenses onto the evaporator coil and is directed away from the air stream. After passing across the coil, the dry, conditioned air is released into the building. In some embodiments, the humidity control systems may also include a ventilation system, which is used to ventilate fresh air from an outdoor environment into the building. In cold weather environments, where the outdoor air temperature is less than the indoor air temperature, the ventilation system can be used to reduce the moisture level of the indoor air, which significantly reduces energy consumption as compared to using the dehumidifier for this purpose.

FIG. 1 shows a humidity control system, shown as system 100, according to an embodiment. The system 100 is installed in a building 10, which may be a residential home/dwelling, a commercial property, or another building or structure. The system 100 is configured to monitor and control the humidity levels of the air within the building 10. In the embodiment of FIG. 1, the system 100 includes a humidity control device 200 that is configured to measure the humidity of the indoor air and to maintain the humidity of indoor air based on user-defined humidity set points (e.g., % RH, etc.). The system 100 also includes a humidification device 104 that is communicably coupled to the humidity control device 200. The humidification device 104 may include a humidifier 105 that is configured to add water to the indoor air. In another embodiment, the humidification device may also include a dehumidifier 107 that is also communicably coupled to the humidity control device 200 and is configured to remove water from the indoor air. In yet another embodiment, the system 100 also includes a ventilation system 109 that is communicably coupled to the humidity control device 200 and is configured to introduce outdoor air into the building.

In the embodiment of FIG. 1, the humidification device 104 is part of a heating, ventilation, and air conditioning (HVAC) system that is also used to control the temperature of the air within the building. In other embodiments, the humidification device 104 may be a standalone device that is separate from the HVAC system. In one embodiment, the humidification device 104 is an evaporative-type humidifier 105 that introduces water vapor into the indoor air through evaporation into the building's HVAC system (e.g., furnace system). The humidifier 105 may include a self-contained housing that routes air from the HVAC system through a humidifier pad (e.g., water panel), which distributes water into the air stream that passes through the housing. In another embodiment, the humidifier 105 may be a steam type humidifier which heats the water until it boils and steam is formed, which is carried by the air through the HVAC ducting into the building 10. In other embodiments, the humidifier 105 may be an ultrasonic humidifier or another type of humidifier unit. In another embodiment, the humidification device 104 is a dehumidifier 107, which may include an electric refrigeration dehumidifier that draws air across a refrigerated evaporator coil to remove moisture from the air. In another embodiment, the dehumidifier 107 may be another form of dehumidification unit. For example, the dehumidifier 107 may be a spray-type dehumidifier, an absorption/desiccant-type dehumidifier, or another type of dehumidifier. In another embodiment, the humidification device 104 may be a ventilation system 109 that is configured to introduce outdoor air into the building. The ventilation system 109 may include a vent valve and/or damper that can be controlled by the humidity control device 200 to selectively introduce dry air into the building from the outdoor environment. In some embodiments, the humidification device 104 includes a fan, blower, and/or another form of air driver to draw air through the humidification device 104. The dehumidifier 107 may also include a drain line to direct condensate that has collected from the evaporator coils away from the dehumidifier 107 and out through a drain in the building 10.

In the embodiment of FIG. 1, the system 100 further includes a plurality of sensors 106 (e.g., remote sensors) that may be used to monitor humidity levels in different rooms, areas, and/or spaces within the building 10. In some embodiments, the sensors 106 are communicably coupled to the humidity control device 200 and are configured to transmit humidity data to the humidity control device 200. In other embodiments, the sensors 106 themselves are humidity control devices that may operate independently or semi-independently from the humidity control device 200 to modify the humidity levels in different zones within the building 10.

As shown in FIG. 1, the system 100 also includes an outdoor temperature sensor 108 coupled to an outer surface of one of the exterior walls 12. The outdoor temperature sensor 108 may be a wired sensor (e.g., thermocouple, etc.), and/or a wireless temperature sensor that is accessible via Bluetooth, WiFi, Zigbee, Z-wave, or another long short range wireless communications format. In another embodiment, the outdoor temperature sensor 108 may be located remotely from the building 10. For example, the outdoor temperature sensor 108 may be part of a weather monitoring station, or may be located on a neighboring building or structure. In yet another embodiment, the outdoor temperature sensor 108 is part of a cloud-based temperature service that is accessible through the internet.

As shown in FIG. 1, the building 10 includes exterior walls 12 defining an enclosed space 14. The enclosed space 14 is subdivided by interior walls into a plurality of rooms 16 (e.g., zones, etc.), each bordered by a portion of at least one exterior wall 12. The exterior walls 12 may be insulated to reduce heat loss from the building 10. The building 10 is also shown to include a plurality of windows 18, each window 18 coupled to an exterior wall 12 and providing visual access to the outdoor environment through the exterior wall 12. The material and/or structural properties of each one of the exterior walls 12 and windows 18 (and/or other exterior structural elements separating the indoor and outdoor spaces) may be defined by a construction factor that may be used to identify and distinguish between different structural elements or characteristics of a structure. In one embodiment, the construction factor includes a type of the structural element (e.g., a building code associated with an exterior wall, a single-glaze/pane window, a double-glaze/pane window, etc.). In another embodiment, the construction factor includes a list of materials used for the structural element (e.g., the types of insulation used, type of interior/exterior trim, number of layers of plywood and/or other backing materials, etc.) and/or dimensions of the structural element. In yet another embodiment, the construction factor includes manufacturer information for the building 10, exterior walls 12, and/or windows 18 (e.g., a brand and a model number for the windows, builder information, etc.), the geographical location of the building 10, and/or other factors associated with the design of the structural element.

Figure 2:
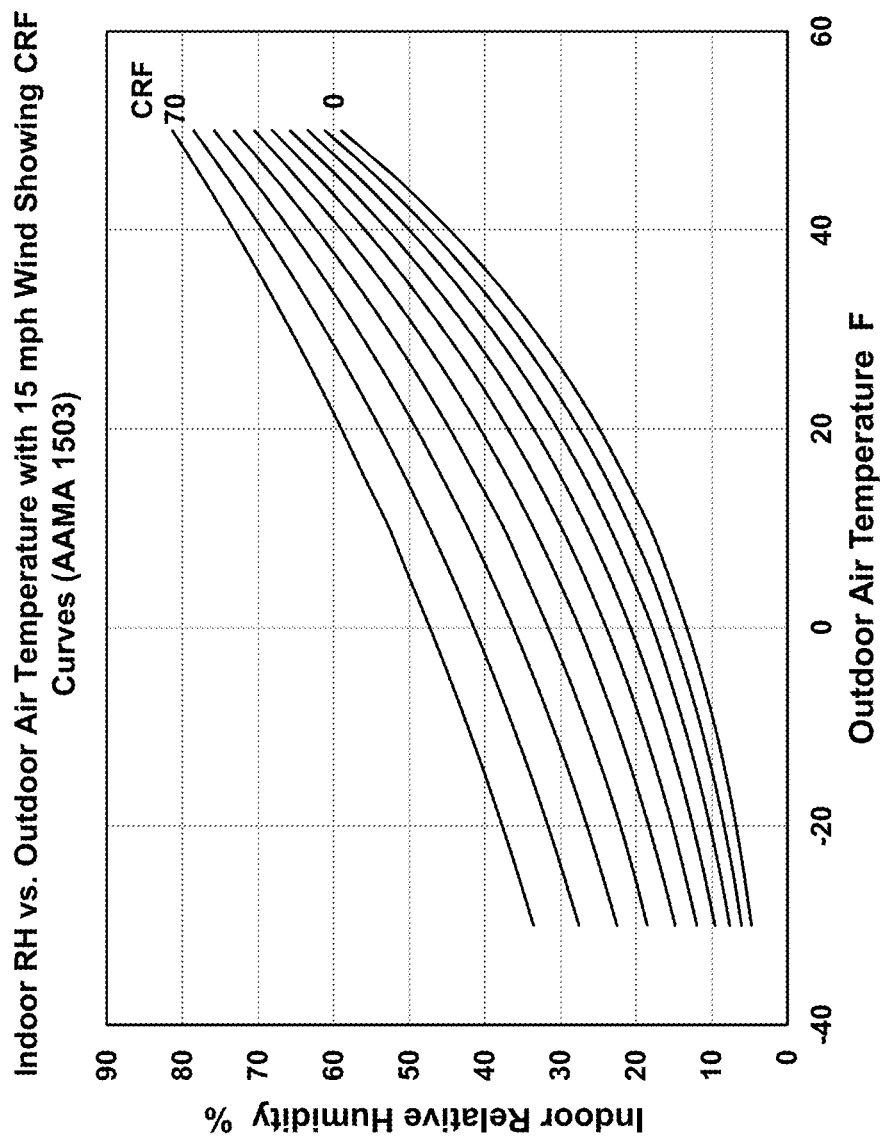
FIG. 2 is a graph of curves corresponding to different condensation resistance factors for window designs, according to an embodiment.

In some embodiments, the construction factor may be a condensation resistance factor (CRF) and/or rating number for the structural element that is obtained by testing each structural element under similar test conditions. The CRF allows for relative comparison of the condensation performance between different structural elements of similar type (e.g., different window designs, etc.). More specifically, the CRF quantifies the relative thermal transmittance of the structure (e.g., combined thermal resistance), or the rate of heat transfer through the structural element due to a temperature difference across the structural element. In one embodiment, the CRF is a dimensionless scale with higher numbers representing a greater resistance to condensation formation. The CRF rates may be used to approximate the maximum allowable indoor relative humidity (e.g., % RH) that can be achieved for various values of the outdoor air temperature, without condensing water onto the interior surfaces of the structural element. For example, FIG. 2 shows curves of constant CRF that correspond to a variety of different window designs. In general, windows with higher CRF rates perform better than those with lower CRF rates, and allow higher values of relative humidity (indoor air relative humidity) before condensation occurs. As shown in FIG. 2, for each value of the CRF, the maximum allowable relative humidity of the indoor air—above which condensation will occur—decreases with outdoor air temperature. However, because the material properties of the windows change with temperature, the reduction in the maximum allowable relative humidity is non-linear with outdoor air temperature. It will be appreciated that the exact shape of the CRF curves will vary depending on types of materials used, and the exact design of the structural element.

Figure 3:
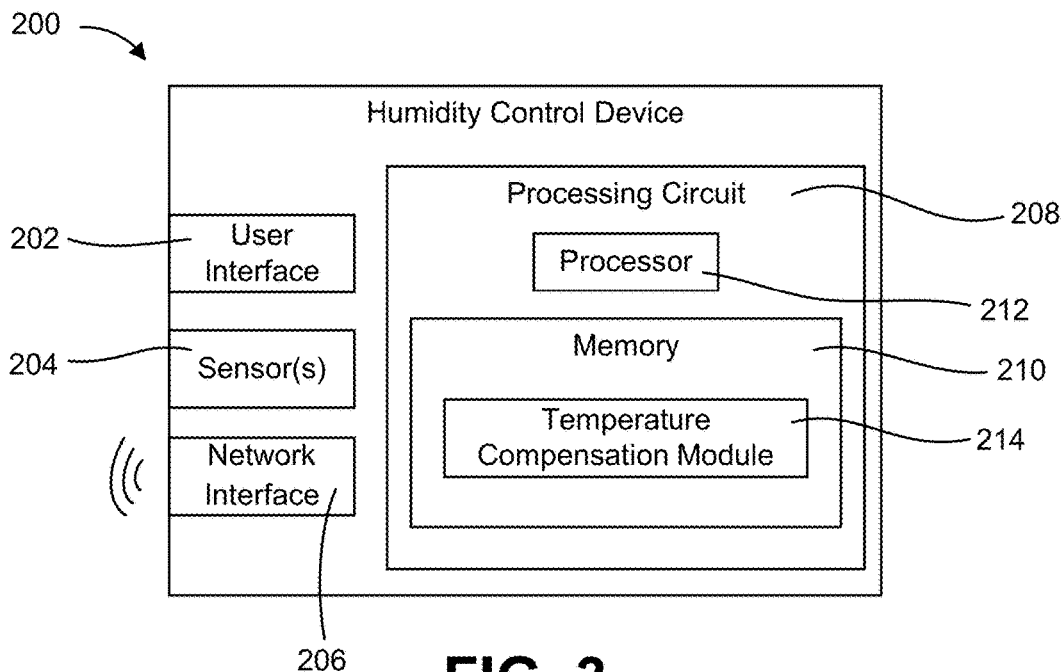
FIG. 3 is a block diagram of an indoor humidity control device, according to an embodiment.

Referring now to FIG. 3, a more detailed view of the humidity control device 200 (e.g., controller, control unit, etc.) is shown, according to an embodiment. The humidity control device 200 is configured to receive user/occupant commands and to control operation of the humidification device 104 (see FIG. 1) based on the user/occupant commands and/or the environmental conditions within the building 10. The humidity control device 200 is also configured to monitor environmental conditions both within and outside of the building. For example, the humidity control device 200 is configured to monitor/measure the relative humidity of air within the building (e.g., the indoor air humidity), and the temperature of air outside of the building (e.g., the real-time outdoor air temperature). In another embodiment, the humidity control device 200 may be configured to monitor additional, fewer, and/or different environmental conditions/parameters.

As shown in FIG. 3, the humidity control device 200 includes a user interface 202 (e.g., a touchscreen display, keypad, a microphone, a speaker, or another form of input/output device) configured to receive user inputs and/or present information to a user; at least one onboard sensor 204 configured to measure air properties and/or environmental conditions within the building; a network interface 206 (e.g., communications interface such as a transceiver, etc.) configured to receive and/or transmit data from the humidity control device 200 to other components of the humidity control system 100 (see FIG. 1); and a processing circuit 208 including memory 210 and a processor 212. The humidity control device 200 may also include a power source (not shown), which may be any wired or wireless power supply. In other embodiments, the humidity control device 200 may include additional, fewer, and/or different components. In the embodiment of FIG. 1, the humidity control device 200 is mounted remotely (e.g., separately) from the humidification device 104. For example, the humidity control device 200 may be or form part of a humidistat that is configured to (i) present the indoor air humidity (e.g., via the user interface 202) to a user/occupant, (ii) receive a user-defined air humidity setting from a user/occupant (e.g., again via the user interface 202), and (iii) control the humidification device 104 to modify the indoor air humidity (measure via onboard sensor 204) based at least partially on the user-defined air humidity setting (e.g., to approximately match the user-defined air humidity setting). The user-defined air humidity setting may be a relative humidity setting, a dew point setting, a building construction factor (described above), or a combination thereof. In another embodiment, the humidity control device 200 may be or form part of a thermostat or other control unit that is mounted to an interior wall of the building 10, and can also be used to control a temperature of the air within the building and/or another environmental condition. In other embodiments, the humidity control device 200 may be a remote computing device such as a mobile phone, tablet, a laptop computer, or another portable computing device.

The at least one onboard sensor 204 is configured to monitor the humidity level (e.g., % RH, etc.) of the indoor air. In other embodiments, the humidity control device 200 may include additional sensors to monitor other environmental conditions of the indoor air (e.g., temperature sensors, etc.). The onboard sensor 204 may be mounted within an enclosure of the humidity control device 200. In other embodiments, the humidity control device 200 may be communicatively coupled to relative humidity sensors disposed in other areas of the building, remote from the humidity control device 200.

As shown in FIG. 3, the processor 212 is operatively coupled to each of the components of the humidity control device 200 and is configured to coordinate operations between the components (e.g., the user interface 202, the onboard sensor(s) 204, and the network interface 206). The memory 210 is configured to store operating parameters for the humidity control device 200. For example, memory 210 may be configured to store (i) user-defined settings (e.g., indoor air humidity settings, etc.), (ii) construction factors for different structural elements, and (iii) indoor air humidity thresholds (e.g., set points, etc.) that are determined by the humidity control device 200. In one embodiment, the memory 210 includes a non-transitory computer-readable medium configured to store computer-readable instructions for the humidity control device 200 that when executed by the processor, cause the humidity control device 200 to provide a variety of functionalities as described herein. For example, as shown in FIG. 3, the memory 210 includes a temperature compensation module 214 (e.g., temperature compensation instructions, etc.), which is structured to determine the set of indoor air humidity thresholds that are used to control the humidification device 104, as will be further described. In other embodiments, the temperature compensation module 214 may form part of a separate control circuit that is communicably coupled to the processing circuit 208. In other embodiments, the humidity control device 200 includes additional, fewer, and/or different components.

Figure 4:
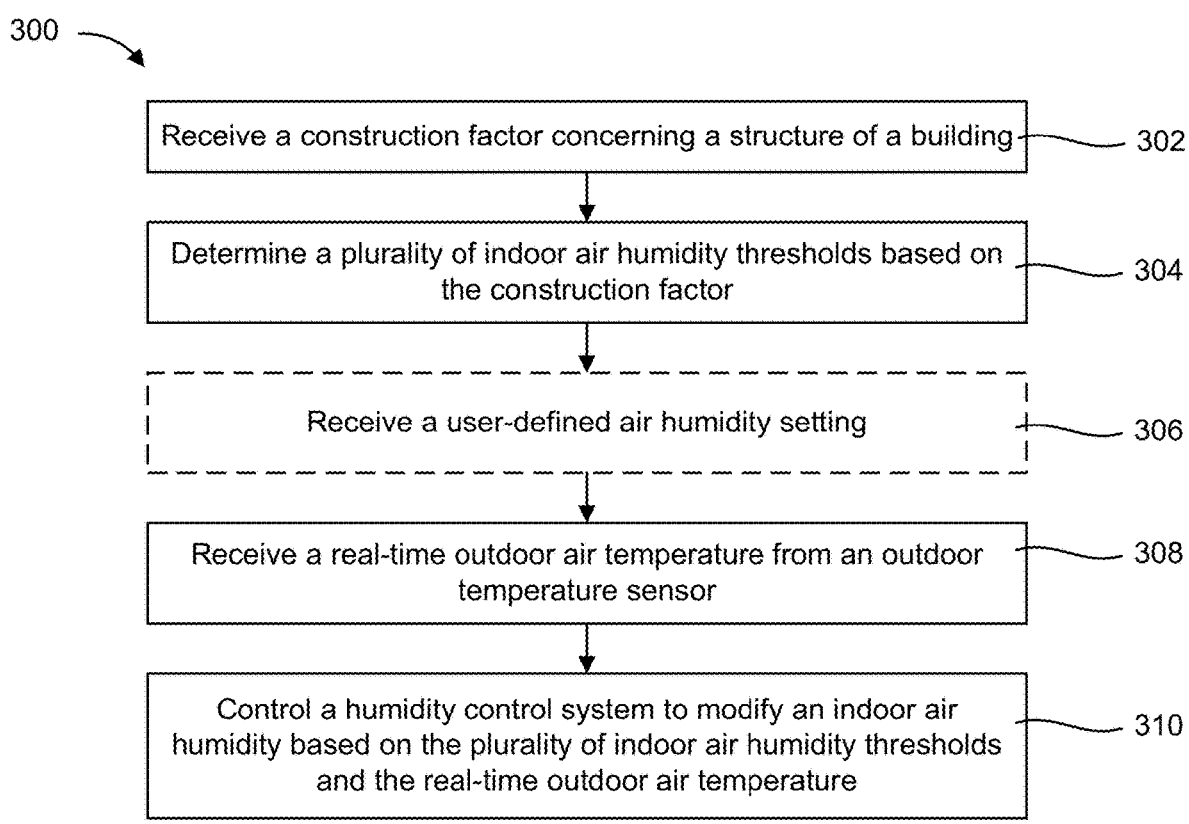
FIG. 4 is a flow diagram of a method of controlling indoor air humidity using a humidity control device, according to an embodiment.

Referring to FIG. 4, a flow diagram of a method 300 of controlling indoor air humidity within a building is shown, according to an embodiment. The method 300 may be implemented by the humidity control system 100 of FIG. 1, for example, through a software application installed on the humidity control device 200 (e.g., through the temperature compensation module 214). As such, reference will be made to the humidity control device 200 when describing method 300. In another embodiment, the method 300 may include additional, fewer, and/or different operations. It will be appreciated that the use of a flow diagram and arrows is not meant to be limiting with respect to the order or flow of operations. For example, in one embodiment, two or more of the operations of method 500 may be performed simultaneously.

At operation 302, the humidity control device 200 receives a construction factor concerning a structure or characteristic of a building (e.g., a window, an exterior wall, or another structural element). The construction factor may be a single value or set of values (e.g., list of values, etc.) that may be used to identify and distinguish between different structural elements or characteristics, as described with reference to FIGS. 1-2 above. In one embodiment, the construction factor is a user-defined value within a pre-defined range of values. The user-defined value may be a CRF rating that is associated with the design of the structural element. In another embodiment, the user-defined value is a numerical value that may be indicative of a desired humidity setting (e.g., a value within a range between 1 and 7, 0 and 100, or any other suitable range of values). In another embodiment, the construction factor is a text input that describes a structural element of the building (e.g., a type, name, model number, etc.) of the structural element.

Operation 302 may include receiving the construction factor via the user interface 202 of the humidity control device 200, and/or via a remote computing device that is communicably coupled to the humidity control device 200 (e.g., via network interface 206). For example, receiving the user-defined value may include receiving an input signal from a knob (e.g., rotary indicator), slider, or other input device of the user interface. In other embodiments, the number may be input using a keypad or touchscreen of the user interface. A user may manually manipulate the input device to vary the user-defined input to any value within the predefined range of values.

In one embodiment, operation 302 includes receiving a text input from the user interface; for example, from a keypad or touchscreen of the user interface. Operation 302 may include receiving manufacturer information, brand and model information, and/or another suitable identifier for the structural element via the text input. In one embodiment, operation 302 includes presenting a user (e.g., via the user interface 202) with a list of construction factors for them to select. Operation 302 may include selecting the appropriate humidity set point or CRF value based on the user input, for example, by crawling through a list of humidity set points or CRF values stored in memory 210 and comparing an identifier for each humidity set point or CRF value with the user input. In another embodiment, operation 302 may include accessing the list of humidity set points or CRF values through the interne (e.g., from a cloud computing device or network server located remotely from the humidity control device 200).

At operation 304, the humidity control device 200 determines a plurality of indoor air humidity thresholds based on the construction factor(s). The indoor air humidity thresholds may be indoor air humidity set points that are used by the control device 200 to control operation of the humidification device 104. The indoor air humidity thresholds may include an indoor air humidity dataset that includes values of indoor air relative humidity (e.g., % RH) as a function of outdoor air temperature that correspond to a given construction factor. Each value of indoor air relative humidity may be equal to the relative humidity above which water will condense on an interior surface of the structural element. In other words, each value of indoor air relative humidity may be a maximum allowable indoor air relative humidity to prevent condensation on the cold interior surfaces of exterior walls, windows, and/or other structural elements. The dataset may form (e.g., define) a curve and/or control function for the maximum value of indoor air relative humidity as a function of outdoor air temperature. For example, the indoor air humidity thresholds may be expressed as an equation (e.g., function) that may be evaluated by the humidity control device 200 based on the outdoor air temperature and/or other user inputs (e.g., user settings for the indoor air relative humidity, etc.).

In some embodiments, operation 304 includes receiving a plurality of construction factors for different structural members. For example, operation 304 may include receiving a construction factor for each one of the windows throughout the building, exterior walls, and/or other structural elements. The humidity control device 200 may use these construction factors to determine which structural element will limit that maximum indoor air relative humidity (with changes in outdoor air temperature). In another embodiment, the humidity control device 200 may combine and/or aggregate these construction factors to determine average indoor humidity thresholds (e.g., an average maximum indoor air relative humidity) as a function of outdoor air temperature, or a room/space/zone specific set of indoor air humidity thresholds.

In one embodiment, operation 304 includes determining the indoor air humidity thresholds based on a user-defined value or a text input from the user (as described with respect to operation 302 above). For scenarios in which the construction factor is a user-defined value, operation 304 may include converting the user-defined value to a humidity set point. For example, operation 304 may include receiving, from the user interface, a signal (e.g., a voltage, etc.) that is indicative of a position of the selector used to specify the user-defined value. Operation 304 may include scaling or otherwise modifying the signal to correspond with the humidity set point. For example, operation 304 may include calculating the humidity set point by inputting the signal into an equation for the humidity set point (e.g., a calibration equation, a scaling equation, etc.). In one embodiment, the equation and/or scaling operation may be used to calculate a CRF value from the user-defined value (e.g., to convert a user input of 2 to a CRF value of 20, etc.). In another embodiment, operation 304 may include crawling through a lookup table stored in memory 210 of the humidity control device 200 to determine the set point value; for example, by matching the user-defined value with a set point identifier that corresponds with the set point value in the lookup table.

Figure 5:
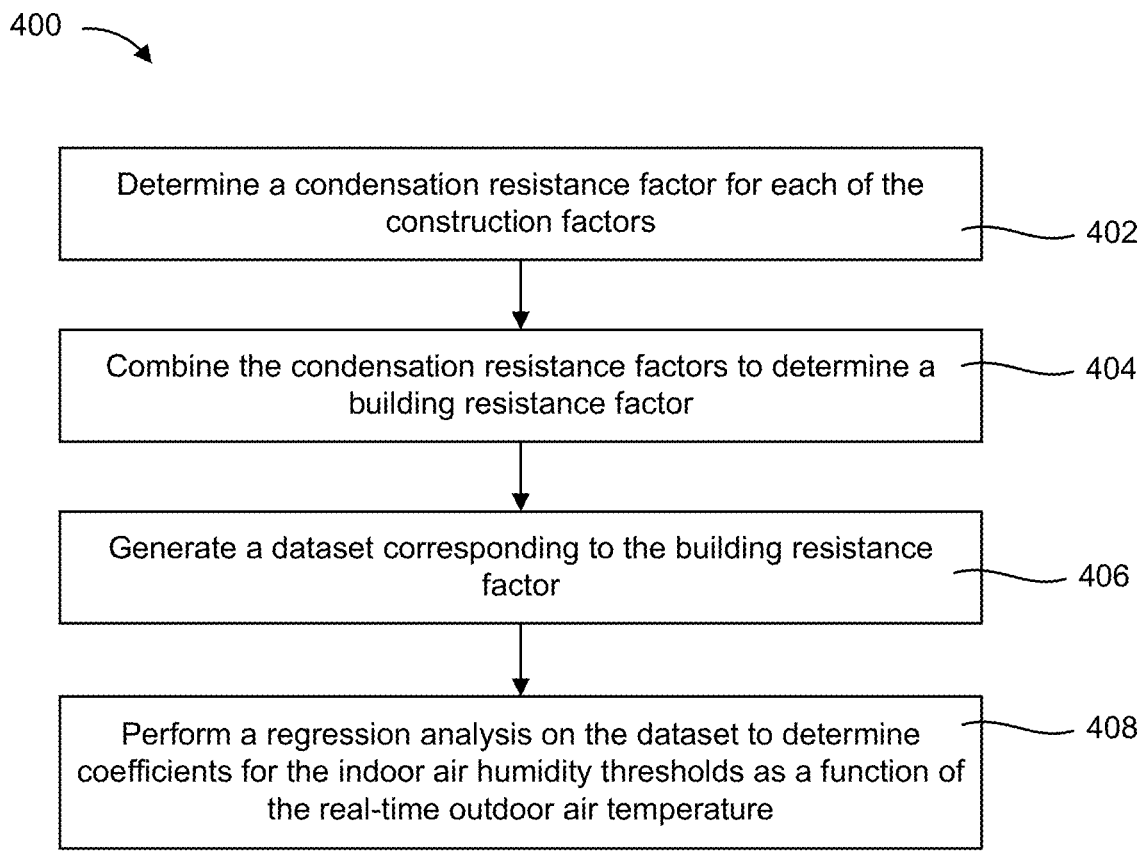
FIG. 5 is a flow diagram of a method of determining indoor environmental conditions thresholds for an humidity control system, according to an embodiment.

For scenarios in which the construction factor is a text input (e.g., a model number for a structural element, manufacturer information for the structural element, a type of structural element, or another text-based input that describes a structural element), operation 304 may include searching for a control function that corresponds with the text input. For example, operation 304 may include searching through a lookup table that is stored in memory 210 of the humidity control device 200 to identify a structural element identifier that corresponds with the text input. The structural element identifier may be a product type, name, product number, or another suitable identifier that can be used to organize the various control functions. The humidity set points and their corresponding identifiers may be stored in a lookup table in memory 210 of the humidity control device 200. Operation 304 may include searching through a lookup table using a keyword search algorithm or use another automated search technique to identify a corresponding structural element identifier in the lookup table. Operation 304 may further include selecting the humidity set point(s) from the lookup table that corresponds with the structural element identifier. Referring to FIG. 5, a flow diagram of a method 400 of determining the indoor air humidity thresholds as a function of the real-time outdoor air temperature is shown, according to an embodiment. The method 400 includes combining a plurality of construction factors to determine the indoor air humidity thresholds. However, it will be appreciated that a similar method may be used to determine the indoor air humidity thresholds based on a single construction factor corresponding to a single structural element (e.g., a window, exterior wall, etc.). For example, the indoor air humidity thresholds may be determined based on the weakest or coldest point (e.g., window, structural wall, etc.) of the building to prevent over-humidification at that point. In another embodiment, the method 400 may include additional, fewer, and/or different operations.

At operation 402, the humidity control device 200 (e.g., processor 212) determines a CRF for each one of the plurality of construction factors. For example, in a scenario where the construction factor includes a type, brand, and model number of the structural element (e.g., window, etc.), operation 402 may include crawling through a table in memory 210 that includes values of CRF that correspond to the type, brand, and model number of various structural elements. In other embodiments, operation 402 may include accessing a database of CRF values, for example, through the internet to determine the CRF based on the construction factor. The CRF values may be determined by testing differently designed structural elements under similar test conditions (e.g., by placing the structural element in a test chamber and controlling the temperatures, humidity levels, and air flow rates on either side of the structural element and monitoring the equilibrium surface temperatures of the structural element). In some embodiments, the CRF values will also vary depending the desired indoor air temperature of the building (e.g., a user-specified indoor air temperature setting).

At operation 404, the humidity control device 200 combines the CRF values to determine a building resistance factor. In another embodiment, operation 404 may include selecting a lowest CRF value, which corresponds to a weakest/coldest point of the building, and using the lowest CRF value as the building resistance factor. The CRF value may correspond to a window that has a lower heat transfer resistance than other windows throughout the building, or to a structural wall that is poorly insulated relative to other walls within the building. In the embodiment of FIG. 5, operation 304 may include averaging the different CRF values for the different structural components of the building. In one embodiment, the operation 304 includes scaling each of the CRF values to account for the fraction of the total surface area of the outer walls that the structural element occupies. For example, in a scenario where the two structural elements are two differently sized windows, operation 404 may include scaling the CRF for each of the windows based on their size, so that the effect of the CRF value for the smaller window is reduced relative to the larger window (because less overall condensation will accumulate on the smaller window than the larger window, all else being equal). In cases where only a single structural element is of concern, operation 304 may not be required.

At operation 406, the humidity control device 200 (e.g., processor 212) generates a dataset corresponding to the building resistance factor. Operation 406 may include retrieving a CRF dataset from memory 210 and/or a database (e.g., a remote server via the internet). The CRF dataset may directly correspond with the building resistance factor and may be in the form of a list and/or table of indoor air relative humidity values as a function of outdoor air temperature (at constant CRF). In another embodiment, operation 406 includes retrieving multiple CRF datasets from memory 210 and/or a database and combining the CRF datasets (e.g., via interpolation, or another approximation) to determine a new CRF dataset that corresponds with the building resistance factor.

Figure 6:
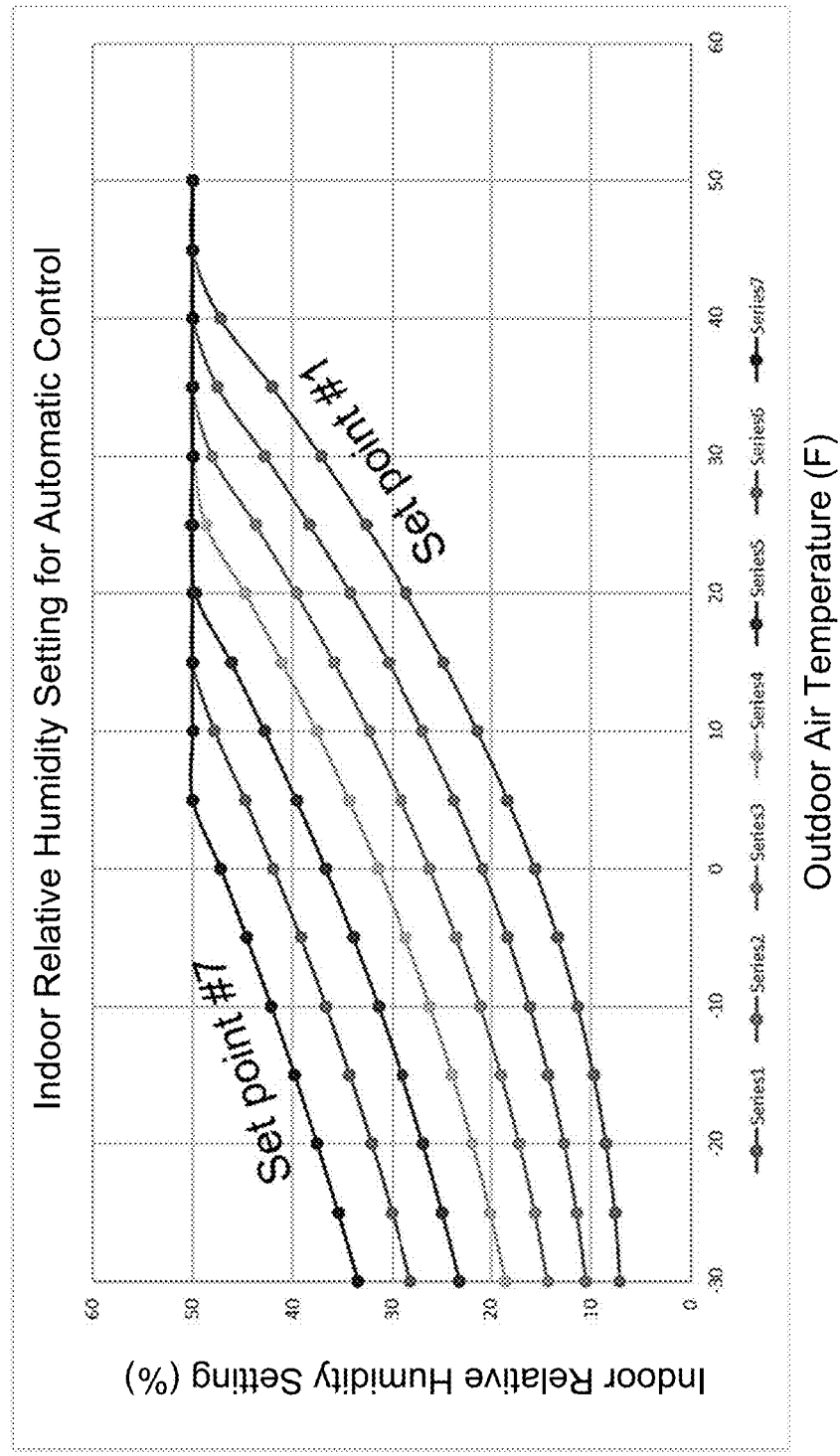
FIG. 6 is a graph of indoor air humidity thresholds that correspond to different relative humidity set points, according to an embodiment.

FIG. 6 shows an example of various datasets that may be determined by the humidity control device 200. In the embodiment of FIG. 6, each dataset corresponds with a different humidity setting (e.g., user-defined settings) of the humidity control device 200. In one embodiment, the humidity settings are user-defined relative humidity settings that specify user/occupant preferences (e.g., % RH) that maintain the building at comfortable humidity levels. In another embodiment, the humidity settings are indicative of different CRF values for one or more structural elements of the building. The humidity settings may be adjusted, by the user, to improve the user's feeling of comfort within the building, and reduced, as needed, during cold periods based on visual indications of condensation (e.g., if the user observes condensation forming on one or more surfaces within the building). In other embodiments, the humidity settings are scaling factors (e.g., offset factors) that that shift the dataset and/or modify the profile of the dataset to establish thresholds below the maximum indoor air relative humidity values to which the indoor air humidity should be controlled. As shown in FIG. 6, each humidity setting includes a plurality of data points (indoor air humidity thresholds) that indicate the maximum allowable indoor air relative humidity at a fixed value of outdoor air temperature. The air humidity setting may be adjusted via a knob (e.g., a knob setting between 1 and 7, etc.), touchscreen display, or another input to the user interface of the humidity control device 200.

Returning to FIG. 5, the method 400 further includes determining (e.g., by the processor 212 of the humidity control device 200) the indoor air humidity thresholds based on the dataset, at operation 408. The indoor air humidity thresholds may take the form of a control function that corresponds with and/or approximates the dataset. As shown in FIG. 6, the control function is a curve that approximates the maximum allowable indoor air relative humidity at different values of the outdoor air temperature (at a fixed humidity setting). Each of the curves shown in FIG. 6 is non-linear, which more accurately approximates rates of heat transfer through the outer walls and/or windows of the building structure (e.g., the change in temperature at an interior surface of the outer wall and/or window that corresponds with a change in the outdoor air temperature).

In one embodiment, the indoor air humidity thresholds may take the form of an equation that can be implemented by the controller to evaluate the maximum allowable indoor air relative humidity at different values of the real-time outdoor air temperature (and at different humidity settings). In this scenario, operation 408 includes performing, by the humidity control device 200 (e.g., processor 212), a regression analysis (e.g., a statistical analysis) on the dataset. As used herein, the term "regression analysis" refers to a statistical analysis for estimating the relationship between an independent variable (e.g., the indoor air humidity thresholds) and at least one dependent variable (e.g., the outdoor air temperature). In particular, operation 408 may include performing a nonlinear regression analysis to more accurately approximate curves of constant building resistance factor (e.g., curves of constant CRF as shown in FIG. 6). In the embodiment of FIG. 6, the non-linear regression results in a quadratic control function (e.g., second degree polynomial equation) of the indoor air humidity thresholds as a function of outdoor air temperature, as shown in Equation (1) below.

$$\text{IAHT}=(C1*S+C2)*\text{ODT}^2+(C3*S^3+C4*S+C5)*\text{ODT}+(C6*S+C7) \tag{1}$$

Where "ODT" corresponds to the outdoor air temperature, "S" corresponds to the user-specified humidity setting, and "C1" through "C7" correspond to constants determined via the regression analysis. In other embodiments, a different control function may be used. For example, in one embodiment, the control function may not include a humidity setting (the control function may be a quadratic equation that is a function of only the outdoor air temperature, etc.). In other embodiments, the control function may be a higher order polynomial equation or another form of non-linear regression.

Returning to FIG. 4, the method 300 includes using the indoor air humidity thresholds to control humidity levels of the indoor air, at operations 306 through 308. At optional operation 306, the humidity control device 200 receives a user-defined air humidity setting. Operation 306 may include receiving the user-defined setting through a user interface (e.g., user interface 202) of the humidity control device 200 or from another device that is communicably coupled to the humidity control device 200. The setting may be a relative humidity setting (e.g., % RH) or a scaling factor that adjusts the indoor air humidity thresholds to different CFR values to increase the user's comfort level (or to reduce the controlled humidity levels based on visual indications of condensation within the building). At operation 308, the humidity control device 200 receives a real-time outdoor air temperature from an outdoor temperature sensor 108. The real-time outdoor air temperature may be a current temperature of the outdoor environment or an approximately of the current temperature based on an average of several real-time outdoor air temperature measurements. In one embodiment, operation 308 includes continuously querying (by the network interface 206) the outdoor temperature sensor 108 for values of the real-time outdoor air temperature and receiving a signal from the outdoor temperature sensor 108 that is indicative of the real-time outdoor air temperature. In some embodiments, operation 308 further includes converting the signal into the real-time outdoor air temperature, for example, by calculating the real-time outdoor air temperature from a correlation (e.g., a calibration for the outdoor temperature sensor 108).

At operation 310, the humidity control device 200 controls the humidification device 104 (see also FIG. 1) to modify an indoor air humidity based on the indoor air humidity thresholds and the real-time outdoor air temperature. Operation 310 may include determining a value of the indoor air humidity threshold (e.g., a maximum value of the relative humidity of the indoor air) based on the outdoor air temperature. For example, operation 310 may include calculating the indoor air humidity threshold using Equation (1), or by crawling through a table of the indoor air humidity thresholds.

Operation 310 may include monitoring a relative humidity of the indoor air, for example, via the onboard sensor(s) 204, to determine a real-time value (e.g., actual value) of the indoor air relative humidity. Operation 310 may include sending a control signal (e.g., via network interface 206 and/or another wired or wireless communications interface) to the humidification device 104 to activate the humidification device 104 in response to a determination that the real-time indoor air relative humidity is less than the indoor air humidity threshold. In situations where the humidification device 104 is a humidifier 105, operation 310 may include operating the humidifier 105 until the real-time indoor air relative humidity is approximately equal to or above the indoor air humidity threshold. In another embodiment, operation 310 may include operating the humidifier 105 until the real-time indoor air relative humidity is within a threshold range of the indoor air humidity threshold (e.g., is within a deactivation buffer or some offset value below the indoor air humidity threshold value). In a scenario where the user-specified humidity setting is a relative humidity setting, and where the relative humidity setting is below the indoor air humidity threshold, operation 310 may include operating the humidifier 105 until the real-time indoor air relative humidity is approximately equal to the user-defined humidity setting, or within some threshold range of the user-defined humidity setting. In another embodiment, operation 310 includes operating the humidifier based only on the indoor air humidity thresholds. In one embodiment, the humidity control device 200 continuously repeats method 400 to automatically track the real-time indoor air relative humidity with the indoor air humidity threshold throughout different parts of the day (e.g., with changes in the real-time outdoor air temperature).

In an embodiment where the humidification device 104 includes a ventilation system or a dehumidifier 107, method 400 may also be used to reduce the real-time indoor air relative humidity to a value that is below the indoor air humidity threshold. Such a control scheme would be useful in situations where the building includes other sources of humidity (e.g., indoor pools, a large number of occupants, water control and delivery systems, etc.) or when the outdoor air temperature drops too quickly (at too high of a rate) for the indoor air humidity to equilibrate with the outdoor air. For example, Operation 310 may include sending a control signal (e.g., via network interface 206 and/or another wired or wireless communications interface) to the ventilation system (or dehumidifier 107) to activate the ventilation system (or dehumidifier 107) in response to a determination that the real-time indoor air relative humidity is greater than the indoor air humidity threshold. Operation 310 may include operating the ventilation system (or dehumidifier 107) until the real-time indoor air relative humidity is approximately equal to or less than the indoor air humidity threshold. In another embodiment, operation 310 may include operating the ventilation system (or dehumidifier 107) by a deactivation buffer (e.g., some offset value below the indoor air humidity threshold value) or within some threshold range of the indoor air humidity threshold. In a scenario where the user-specified humidity setting is a relative humidity setting, and where the relative humidity setting is below the indoor air humidity threshold, operation 310 may include operating the ventilation system (or dehumidifier 107) until the real-time indoor air relative humidity is below the user-defined relative humidity setting, or within some threshold range of the user-defined relative humidity setting. Among other benefits, using a ventilation system to vent fresh dry air into the building during cold periods may increase efficiency and reduce operating costs as compared to using a dehumidifier 107.

While the instant disclosure has been described above according to its preferred embodiments, it can be modified within the spirit and scope of this disclosure. This application is therefore intended to cover any variations, uses, or adaptations of the instant disclosure using the general principles disclosed herein. Further, the instant application is intended to cover such departures from the present disclosure as come within the known or customary practice in the art to which this disclosure pertains.

Notwithstanding the embodiments described above in FIGS. 1-6, various modifications and inclusions to those embodiments are contemplated and considered within the scope of the present disclosure. Any of the operations described herein can be implemented as computer-readable instructions stored on a non-transitory computer-readable medium such as a computer memory.

It is also to be understood that the construction and arrangement of the elements of the systems and methods as shown in the representative embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed.

Accordingly, all such modifications are intended to be included within the scope of the present disclosure. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other illustrative embodiments without departing from scope of the present disclosure or from the scope of the appended claims.

Furthermore, functions and procedures described above may be performed by specialized equipment designed to perform the particular functions and procedures. The functions may also be performed by general-use equipment that executes commands related to the functions and procedures, or each function and procedure may be performed by a different piece of equipment with one piece of equipment serving as control or with a separate control device.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent Moreover, although the figures show a specific order of method operations, the order of the operations may differ from what is depicted. Also, two or more operations may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection operations, processing operations, comparison operations, and decision operations.

What is claimed is:

1. A system, comprising:
    a humidification device configured to modify an indoor air humidity within a building; and
    a controller communicably coupled to the humidification device, the controller configured to:
        receive a construction factor concerning a structure of the building, the construction factor corresponding to a non-linear curve of the indoor air humidity with respect to a real-time outdoor air temperature at a constant value of a condensation resistance factor;
        determine a plurality of indoor air humidity thresholds corresponding to a plurality of outdoor air temperatures based on the construction factor;
        receive the real-time outdoor air temperature; and
        control the humidification device to modify the indoor air humidity based on the plurality of indoor air humidity thresholds and the real-time outdoor air temperature.

2. The system of claim 1, wherein the construction factor is a user-defined value within a predefined range of values, and wherein determining the plurality of indoor air humidity thresholds comprises:
    converting the user-defined value to a humidity set point; and
    evaluating a humidity function based on the humidity set point, the humidity function corresponding to the non-linear curve of the indoor air humidity.

3. The system of claim 1, wherein the controller further comprises a user interface configured to allow a user to directly adjust the construction factor, and wherein the determining the plurality of indoor air humidity thresholds comprises:
    determining the condensation resistance factor of a structural element of the building based on the construction factor; and
    determining the non-linear curve of the indoor air humidity.

4. The system of claim 1, wherein the plurality of indoor air humidity thresholds together generate a non-linear control function.

5. The system of claim 4, wherein the plurality of indoor air humidity thresholds together generate a quadratic control function.

6. The system of claim 1, wherein the plurality of indoor air humidity thresholds together generate a control function that approximates the non-linear curve of the indoor air humidity.

7. The system of claim 1, wherein the controller comprises:
a user interface configured to present the indoor air humidity and receive a user-defined air humidity setting; and
an onboard humidity sensor configured to measure the indoor air humidity, wherein the controller is further configured to control the humidification device to modify the indoor air humidity based on the user-defined air humidity setting.

8. The system of claim 7, wherein the controller is configured to scale the construction factor based on the user-defined air humidity setting.

9. The system of claim 1, wherein the construction factor is one of a plurality of construction factors, and wherein the controller is further configured to:
determine the condensation resistance factor based on each of the plurality of construction factors; and
determine a building resistance factor from the plurality of condensation resistance factors.

10. A system, comprising:
a humidification device configured to modify an indoor air humidity within a building; and
a controller communicably coupled to the humidification device, the controller configured to:
receive a construction factor concerning a structure of the building, comprising receiving a text input that describes a structural element of the building;
determine a plurality of indoor air humidity thresholds corresponding to a plurality of outdoor air temperatures based on the construction factor, comprising:
searching a lookup table that is stored in memory of the controller to identify a structural element identifier that corresponds with the text input; and
evaluating a humidity function using a humidity set point that corresponds with the structural element identifier, the humidity function defining a curve of the plurality of indoor air humidity thresholds with respect to the plurality of outdoor air temperatures;
receive a real-time outdoor air temperature; and
control the humidification device to modify the indoor air humidity based on the plurality of indoor air humidity thresholds and the real-time outdoor air temperature.

11. A system, comprising:
a humidification device configured to modify an indoor air humidity within a building; and
a controller communicably coupled to the humidification device, the controller configured to:
receive a construction factor concerning a structure of the building;
determine a condensation resistance factor based on the construction factor;
generate a dataset corresponding to the condensation resistance factor;
determine the plurality of indoor air humidity thresholds corresponding to a plurality of outdoor air temperatures by performing a regression analysis on the dataset to determine coefficients for an equation representing the plurality of indoor air humidity thresholds with respect to the real-time outdoor air temperature;
receive a real-time outdoor air temperature; and
control the humidification device to modify the indoor air humidity based on the plurality of indoor air humidity thresholds and the real-time outdoor air temperature.

12. A method, comprising:
receiving, by a controller, via a user interface of the controller, a construction factor concerning a structure of a building, the construction factor corresponding to a non-linear curve of an indoor air humidity within the building with respect to a real-time outdoor air temperature at a constant value of a condensation resistance factor;
determining, by the controller, a plurality of indoor air humidity thresholds corresponding to a plurality of outdoor air temperatures based on the construction factor;
receiving, by the controller, via a network interface of the controller, the real-time outdoor air temperature; and
controlling, by the controller, a humidification device to modify the indoor air humidity based on the plurality of indoor air humidity thresholds and the real-time outdoor air temperature.

13. The method of claim 12, wherein the construction factor is a user-defined value within a predefined range of values, and wherein determining the plurality of indoor air humidity thresholds comprises:
converting, by the controller, the user-defined value to a humidity set point; and
evaluating, by the controller, a humidity function based on the humidity set point, the humidity function corresponding to the non-linear curve of the indoor air humidity.

14. The method of claim 12, wherein determining the plurality of indoor air humidity thresholds comprises determining, by the controller, a non-linear control function of indoor air humidity as a function of the real-time outdoor air temperature.

15. The method of claim 12, wherein determining the plurality of indoor air humidity thresholds comprises determining, by the controller, a quadratic control function of indoor air humidity as a function of the real-time outdoor air temperature.

16. The method of claim 12, wherein controlling the humidification device comprises:
receiving, by the controller via an onboard humidity sensor, the indoor air humidity;
determining, by the controller, one of the plurality of indoor air humidity thresholds based on the real-time outdoor air temperature; and
controlling the humidification device to modify the indoor air humidity based on the one of the plurality of indoor air humidity thresholds.

17. A method, comprising:
receiving, by a controller, via a user interface of the controller, a construction factor concerning a structure of a building, comprising receiving a text input that describes a structural element of the building;

determining, by the controller, a plurality of indoor air humidity thresholds corresponding to a plurality of outdoor air temperatures based on the construction factor, comprising:
  searching a lookup table that is stored in memory of the controller to identify a structural element identifier that corresponds with the text input; and
  evaluating a humidity function using a humidity set point that corresponds with the structural element identifier, the humidity function defining a curve of the plurality of indoor air humidity thresholds with respect to the plurality of outdoor air temperatures;
receiving, by the controller, via a network interface of the controller, a real-time outdoor air temperature; and
controlling, by the controller, a humidification device to modify an indoor air humidity within the building based on the plurality of indoor air humidity thresholds and the real-time outdoor air temperature.

18. A system, comprising:
  a humidification device configured to modify an indoor air humidity within a building; and
  a controller communicably coupled to the humidification device, the controller configured to:
    receive a user-defined setting concerning the indoor air humidity, the user-defined setting corresponding to a non-linear curve of the indoor air humidity with respect to a real-time outdoor air temperature at a constant value of a condensation resistance factor;
    receive the real-time outdoor air temperature;
    determine an indoor air humidity threshold based on the non-linear curve of the indoor air humidity; and
    control the humidification device to modify the indoor air humidity based on the indoor air humidity threshold.

19. The system of claim 18, wherein the non-linear curve is a second degree polynomial in terms of the real-time outdoor air temperature.

* * * * *